(12) United States Patent
Wang et al.

(10) Patent No.: US 11,606,145 B2
(45) Date of Patent: Mar. 14, 2023

(54) SILICON PHOTONICS BASED SINGLE-WAVELENGTH 100 GBIT/S PAM4 DWDM TRANSCEIVER IN PLUGGABLE FORM FACTOR

(71) Applicant: Alpine Optoelectronics, Inc., Fremont, CA (US)

(72) Inventors: Tongqing Wang, Fremont, CA (US); Xingyu Zhang, Fremont, CA (US); Dawei Zheng, Fremont, CA (US); Ming Ding, Fremont, CA (US); Yong Li, Chengdu (CN)

( * ) Notice: Subject to any disclaimer, the term of this patent is extended or adjusted under 35 U.S.C. 154(b) by 0 days.

(21) Appl. No.: 17/649,177

(22) Filed: Jan. 27, 2022

(65) Prior Publication Data
US 2022/0255627 A1 Aug. 11, 2022

Related U.S. Application Data

(60) Provisional application No. 63/143,693, filed on Jan. 29, 2021.

(51) Int. Cl.
*H04B 10/00* (2013.01)
*H04B 10/40* (2013.01)
(Continued)

(52) U.S. Cl.
CPC ............ *H04B 10/40* (2013.01); *G02B 6/428* (2013.01); *G02B 6/4216* (2013.01); *G02B 6/4228* (2013.01); *G02B 6/4246* (2013.01); *G02B 6/4277* (2013.01); *G02B 6/4285* (2013.01); *H04B 10/503* (2013.01); *H04B 10/541* (2013.01); *H04J 14/06* (2013.01)

(58) Field of Classification Search
CPC combination set(s) only.
See application file for complete search history.

(56) References Cited

U.S. PATENT DOCUMENTS 6,782,017 B1 * 8/2004 Kai ................... H01S 5/0687
372/18
6,845,108 B1 * 1/2005 Liu ................... H01S 3/1109
372/20

(Continued)

*Primary Examiner* — Agustin Bello
(74) *Attorney, Agent, or Firm* — Cionca IP Law P.C.; Marin Cionca

(57) ABSTRACT

A silicon photonics based single wavelength 100 Gbit/s PAM4 DWDM transceiver in a pluggable form factor having a transmitter, said transmitter having: a DWDM laser source; a fiber array pigtail having a polarization maintaining fiber and an output single mode fiber; a silicon photonics modulator chip configured to optically connect to the DWDM laser source through the usage of the polarization maintaining fiber, a modulator driver chip connected to the silicon photonics modulator chip and an LC receptacle configured to optically connect to the silicon photonics modulator chip through the usage of the output single mode fiber. The disclosed transmitter may be further comprised of a reference loop within the silicon photonics modulator chip to allow for the utilization of a passive alignment approach for optically connected elements. The disclosed transceiver may be configured for use with C-band DWDM applications for utilization in applicable technologies, including 5G telecommunications.

20 Claims, 6 Drawing Sheets

(51) Int. Cl.
*G02B 6/42* (2006.01)
*H04B 10/50* (2013.01)
*H04B 10/54* (2013.01)
*H04J 14/06* (2006.01)

(56) References Cited

U.S. PATENT DOCUMENTS

| | | | | |
|---|---|---|---|---|
| 7,146,103 B2* | 12/2006 | Yee | ........................ | H04B 10/64 |
| | | | | 398/205 |
| 7,447,436 B2* | 11/2008 | Yee | ........................ | H04B 10/50 |
| | | | | 398/205 |
| 9,319,142 B2* | 4/2016 | Kato | ..................... | H04B 10/65 |
| 9,454,059 B1* | 9/2016 | Nagarajan | ............. | G02F 1/2257 |
| 9,477,051 B2* | 10/2016 | Oki | ...................... | H04B 10/532 |
| 9,478,940 B2* | 10/2016 | Welford | ................ | H01S 5/0287 |
| 9,871,590 B2* | 1/2018 | Matsui | ................. | G02B 6/3812 |
| 9,874,800 B2* | 1/2018 | Nagarajan | ............. | G02F 1/0121 |
| 10,527,805 B2* | 1/2020 | Mizuno | ................ | G02B 6/4246 |
| 10,721,011 B2* | 7/2020 | DeAndrea | ........... | H04J 14/0228 |
| 11,057,113 B1* | 7/2021 | Xie | ........................ | H04B 10/50 |
| 11,347,126 B2* | 5/2022 | Saeki | ................... | G02F 1/2257 |
| 11,454,771 B2* | 9/2022 | Mizuno | ................ | G02B 6/4277 |
| 2009/0046294 A1* | 2/2009 | Kaplan | ............... | G02B 6/12004 |
| | | | | 356/460 |
| 2010/0067854 A1* | 3/2010 | Oki | ....................... | H01R 13/748 |
| | | | | 385/92 |
| 2013/0148965 A1* | 6/2013 | Losio | ..................... | H04J 14/06 |
| | | | | 398/43 |
| 2014/0177237 A1* | 6/2014 | Welford | ................ | A61B 5/0073 |
| | | | | 362/317 |
| 2015/0104177 A1* | 4/2015 | Kato | ...................... | H04B 10/40 |
| | | | | 398/79 |
| 2015/0326319 A1* | 11/2015 | Oki | ........................ | H04B 10/40 |
| | | | | 398/135 |
| 2016/0103286 A1* | 4/2016 | Matsui | ................ | G02B 6/4246 |
| | | | | 398/139 |
| 2016/0266336 A1* | 9/2016 | Oki | ......................... | G02B 6/4257 |
| 2017/0082801 A1* | 3/2017 | Welch | .................. | H04B 10/801 |
| 2018/0083599 A1* | 3/2018 | Kippenberg | ........... | H03H 9/462 |
| 2018/0109348 A1* | 4/2018 | Salsi | .................... | H04B 10/503 |
| 2018/0231726 A1* | 8/2018 | Mizuno | ................ | G02B 6/4246 |
| 2019/0052392 A1* | 2/2019 | DeAndrea | ........... | H04J 14/0212 |
| 2020/0021899 A1* | 1/2020 | Stojanovic | ......... | H04Q 11/0067 |
| 2020/0195350 A1* | 6/2020 | Matsui | ................ | G02B 6/4281 |
| 2021/0223490 A1* | 7/2021 | Matsui | ................ | H04B 10/40 |
| 2022/0255627 A1* | 8/2022 | Wang | .................... | G02B 6/428 |
| 2022/0264759 A1* | 8/2022 | Sawyer | ................ | G06F 1/183 |

* cited by examiner

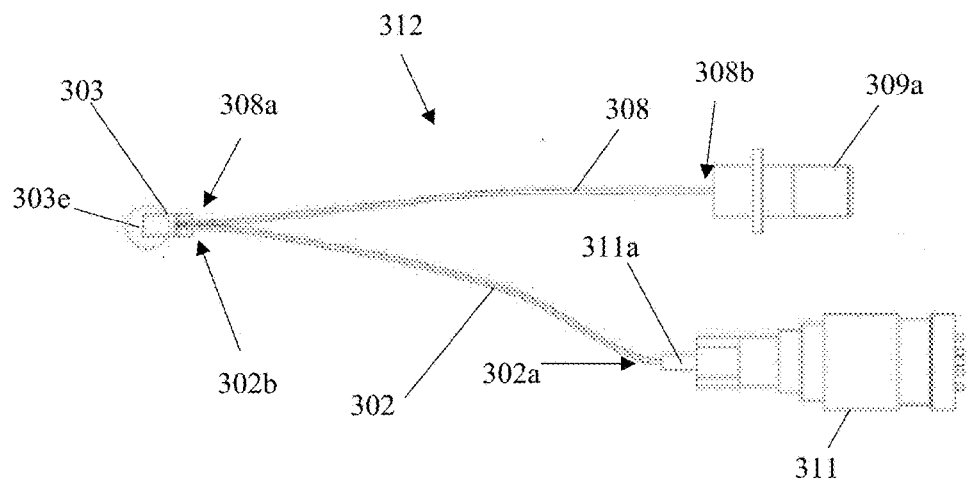
FIG. 3A
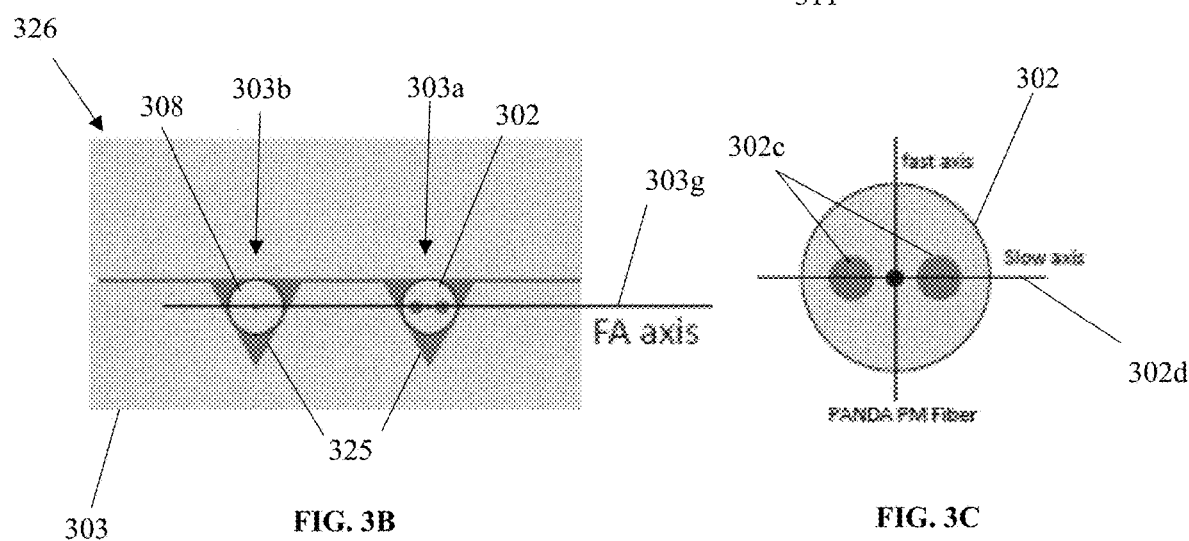
FIG. 3B
FIG. 3C
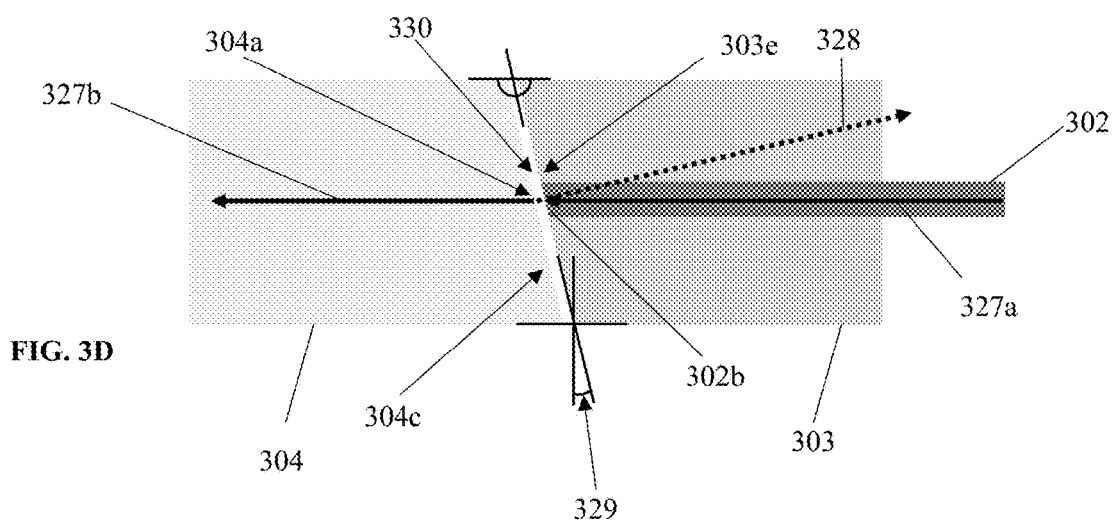
FIG. 3D

SILICON PHOTONICS BASED SINGLE-WAVELENGTH 100 GBIT/S PAM4 DWDM TRANSCEIVER IN PLUGGABLE FORM FACTOR

CROSS-REFERENCE TO RELATED APPLICATIONS

This application claims the benefit of U.S. Provisional Application No. 63/143,693 filed Jan. 29, 2021, which is hereby incorporated by reference, to the extent that it is not conflicting with the present application.

BACKGROUND OF INVENTION

1. Field of the Invention

The invention relates generally to transceivers and specifically to silicon photonics based single-wavelength PAM4 DWDM transceivers provided in a pluggable form factor.

2. Description of the Related Art

Optical dense wavelength division multiplexing (DWDM) transmissions over standard single mode fibers ("SMF", "SM fiber") has enabled superb capacity and phenomenal reach to support the rapid growth of global data traffic in various applications, such as internet and cloud services, 5G edge computing, and so on. For data center interconnects (DCI) with a typical distance of 40-80 km, C-band DWDM links that employ intensity modulation and direct detection (IM/DD) with 4-level pulse amplitude modulation (PAM4) are considered as a cost-effective solution with reduced power consumption and low latency. In recent years, PAM4 DWDM transceivers utilizing silicon photonics integrated circuits have gained tremendous attention, because the silicon photonics platform has a few advantages, including complementary metal-oxide-semiconductor (CMOS) compatibility, low cost, high yield, small footprint, and high performance, compared to other material platforms such as LiNBO3, polymer, III-V, etc. For example, silicon-photonics-based pluggable DWDM QSFP28 transceivers supporting dual-carrier 100 Gbit/s (each wavelength carrying 50 Gbit/s PAM4 signal) on the ITU-T 100 GHz grid have been deployed for IM/DD transmission over typical DCI links. However, single-wavelength 100 Gbit/s PAM4 pluggable transceivers based on silicon photonics technology haven't been reported for C-band DWDM applications.

Therefore, there is a need to solve the problems described above by providing a single-wavelength 100 Gbit/s PAM4 pluggable transceiver based on silicon photonics technology for C-band DWDM applications.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a transceiver comprising a transmitter is provided, the transmitter having: a DWDM laser source; a fiber array pigtail having: a fiber array coupler; a polarization maintaining fiber having a first end configured to optically connect with the DWDM laser source and a second end nested within a laser input channel within the fiber array coupler; an output single mode fiber having a first end nested within a signal output channel within the fiber array coupler and a second end optically connected to a signal output LC receptacle; a loop input single mode fiber having a first end nested within a loop input channel within the fiber array coupler and a second end optically connected to a loop input LC receptacle; a loop output single mode fiber having a first end nested within a loop output channel within the fiber array coupler and a second end optically connected to a loop output LC receptacle; a silicon photonics modulator chip connected to the fiber array coupler, the silicon photonics modulator chip comprising: a laser input interface optically connected to the second end of polarization maintaining fiber; a signal output interface optically connected to the first end of the signal output single mode fiber; a loop input interface optically connected to the first end of the loop input single mode fiber; a loop output interface optically connected to the first end of the loop output single mode fiber; a reference loop disposed between the loop input interface and the loop output interface; a Mach-Zehnder interferometer disposed between the laser input interface and the signal output interface; a first photodetector disposed between the laser input interface and the Mach-Zehnder interferometer; a second photodetector disposed between the signal output interface and the Mach-Zehnder interferometer; and a modulator driver chip electrically connected to the silicon photonics modulator chip; wherein the transceiver is configured to transmit and receive a single wavelength 100 Gbit/s PAM4 optical signals. Thus, an advantage is that the silicon based photonics modulator chip enjoys several benefits over other comparable photonics modulator chips, such as having complementary metal-oxide-semiconductor compatibility, lower cost, a smaller footprint and superior performance. Another advantage is that a single wavelength PAM4 optical signal may be generated and sent over one single mode fiber for transmission, reducing the quantity of cables and other optical components needed for transmission. Another advantage is that the presence of a reference loop within the transmitter enables the utilization of a passive alignment approach for aligning the fiber array coupler and the silicon photonics modulator chip, allowing for faster, easier alignment of the fiber array coupler with the silicon photonics modulator chip and not requiring the silicon photonics modulator chip to be operational during alignment.

In another aspect, a transceiver having a transmitter is provided, the transmitter having: a laser source; a fiber array pigtail having: a fiber array coupler; a polarization maintaining fiber having a first end configured to optically connect with the laser source and a second end nested within a laser input channel within the fiber array coupler; an output single mode fiber having a first end nested within a signal output channel within the fiber array coupler and a second end optically connected to a signal output LC receptacle; a silicon photonics modulator chip connected to the fiber array coupler, the silicon photonics modulator chip comprising: a laser input interface optically connected to the second end of polarization maintaining fiber; a signal output interface optically connected to the first end of the signal output single mode fiber; and a modulator driver chip connected to the silicon photonics modulator chip. Again, an advantage is that the silicon based photonics modulator chip enjoys several benefits over other comparable photonics modulator chips, such as having complementary metal-oxide-semiconductor compatibility, lower cost, a smaller footprint and superior performance. Another advantage is that a single wavelength PAM4 optical signal may be generated and sent over one single mode fiber for transmission, reducing the quantity of cables and other optical components needed for transmission. Another advantage is that the disclosed transmitter may allow the utilization of an active alignment approach for aligning the fiber array coupler with the silicon photonics modulator chip, allowing for the usage of parts that are manufactured less precisely, thus enabling the use cheaper parts and/or parts that are manufactured more rapidly.

In another aspect a method of passively aligning a fiber array coupler with a silicon photonics modulator chip is provided, said method comprising the steps of: positioning the fiber array coupler such that it is positioned adjacently with the silicon photonics modulator chip; introducing a laser light to the silicon photonics modulator chip, such that a laser light travels through a loop input single mode fiber nested within a loop input channel within the fiber array coupler, enters the silicon photonics modulator chip through a loop input interface on the silicon photonics modulator chip, travels through a reference loop within the silicon photonics modulator chip, exits the silicon photonics modulator chip through a loop output interface and travels through a loop output single mode fiber nested within a loop output channel within the fiber array coupler; adjusting the position of the fiber array coupler until the intensity of the laser light exiting the loop output single mode fiber is maximized; and attaching a fiber array coupler to the silicon photonics modulator chip such that the fiber array coupler is secured to the silicon photonics modulator chip. One advantage of the passive alignment method is that the fiber array coupler may be aligned with the silicon photonics modulator chip without requiring the transmitter to be operating or using the operational optical pathway. This allows said alignment process to be performed prior to the transmitter being fully operational, thus providing flexibility in the assembly process by allowing said alignment to be performed earlier or later in the manufacturing process at the manufacture's discretion.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which:

FIG. 3A illustrates a fiber array pigtail having a laser source enclosed within a TO package, according to an aspect.

FIG. 3B illustrates the cross-sectional view of an output single mode fiber and a polarization maintaining fiber nested within a fiber array coupler, according to an aspect.

FIG. 3C illustrates the cross-sectional view of a polarization maintaining fiber, according to an aspect.

FIG. 3D illustrates the cross-sectional view of an angle offset optical interface between a silicon photonics modulator chip and a FA coupler, according to an aspect.

DETAILED DESCRIPTION

Figure 1:
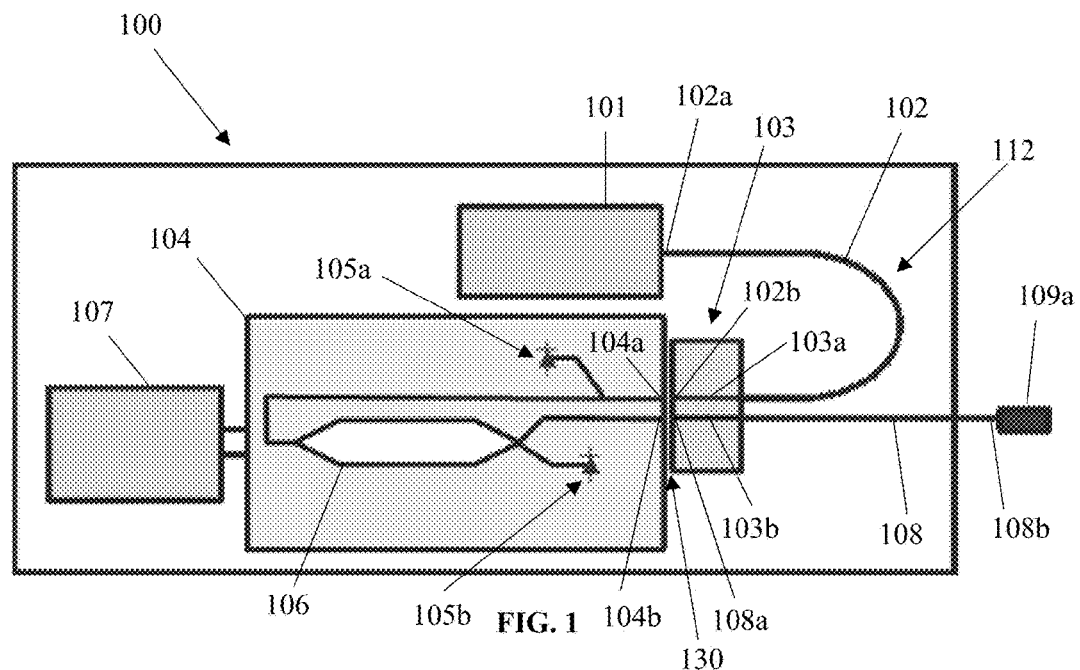
FIG. 1 illustrates the structure of the disclosed single-wavelength 100 Gbit/s PAM4 DWDM transmitter having a silicon photonics modulator chip, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

For the following description, it can be assumed that most correspondingly labeled elements across the figures (e.g., 104 and 204, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates the structure of the disclosed single-wavelength 100 Gbit/s PAM4 DWDM transmitter 100 having a silicon photonics modulator chip 104, according to an aspect. The disclosed single-wavelength PAM4 transmitter ("single wavelength transmitter", "PAM4 transmitter", "transmitter") 100 may be packaged in a pluggable form factor including but not limited to SFP56, QSFP28, QSFP-DD, OSFP, CFP2, CFP4, etc., which are all defined in the multi-source agreements (MSA) for optical transceivers. Said transmitter 100 may be configured to work with external multiplexers/demultiplexers on the ITU-T DWDM grid at C-band, wherein C-band may define a range of wavelengths between 1528.77 nm and 1568.3 6 nm. The disclosed transmitter 100 of FIG. 1 may be comprised of a laser source 101, such as a DWDM laser source, a fiber array ("FA") pigtail ("pigtail") 112, a modulator driver chip 107, and a silicon photonics modulator chip ("silicon photonics chip") 104. The FA pigtail 112 may be comprised of a polarization maintaining fiber 102, an output single mode fiber 108, a signal output LC receptacle 109a, and a fiber array coupler ("FA coupler", "FA element") 103.

The DWDM laser source ("laser source") 101 may be connected to the FA coupler 103 by a polarization maintaining fiber ("PM fiber", "PMF") 102 configured to allow a laser light emitted by the laser source 101 to maintain its polarization during transit between the DWDM laser source 101 and the silicon photonics modulator chip 104. The DWDM laser source 101 may be hermetically packaged within a shielded enclosure such as a transistor outline (TO) package, such as TO package 311 of FIG. 3, a box package, or other suitable alternative. The TO package diameter or box width may be less than 8 mm to fit easily in 100 G pluggable MSA packages such as QSFP28, QSFP-DD, OSFFP, CFP2, CFP4, etc. The laser source 101 enclosure may contain a high-power laser diode (not shown), a thermal electric cooler (TEC) (not shown), a thermistor (not shown), a monitor photodetector (PD) (not shown), and an isolator (not shown). The TEC may be used to tune the laser wavelength onto a desired ITU-T DWDM grid.

As described above, the FA pigtail 112 may be optically connected to the laser source 101 by the fiber coupling end 102a of the polarization-maintaining fiber 102. For a compact package, micro-bending/bending-insensitive PMF 102 and/or micro-bending/bending-insensitive single-mode fiber ("SMF") 108 may also be used. A chip coupling end of the FA coupler 103 may be attached to a coupling surface of the silicon photonics modulator chip 104 to form an optical interface 130 using optical epoxy (not shown), whereas the PMF 102 and an output SMF 108 may each have a corresponding portion sandwiched within the FA coupler in order to facilitate optical connections between the PMF 102, output SMF 108 and the silicon photonics modulator chip 104. It should be understood that the sandwiching of each fiber within a corresponding channel of the FA coupler 103 results in said portion of the fiber being nested within the FA coupler 103, and thus the terms "sandwiched" and "nested" may be used interchangeably to describe the positioning of each applicable portion of each fiber with the FA coupler.

The output SMF 108 may be terminated by (but not limited to) a signal output LC receptacle 109a and may optically connect the signal output LC receptacle 109a to the silicon photonics modular chip 104. The modulator driver chip 107 may be connected to silicon photonics modulator 104 via wire bonding or flip-chip techniques. The silicon photonics modulator chip 104 may contain certain active components such as high-speed Mach-Zehnder interferometer (MZI) data modulator 106, a phase shifter (not shown), and monitor photodetectors ("PDs") 105a, 105b utilized to perform the necessary operations to generate a single wavelength PAM4 signal for transmission using a laser source 101. The MZI data modulator 106 may enable the splitting of the laser light into split beams, encoding data to and phase shifting each split beam as needed and recombining of each split beam into a single wavelength optical signal.

The FA element 103 may enable direct butt coupling between the output SMF 108, PMF 102 and the silicon photonics modulator chip 104, the silicon photonics modulator chip 104 comprising low-loss high-power-handling edge couplers as outlined herein. The fiber nested within the laser input channel 103a of the fiber array coupler 103 that launches light into the silicon photonics modulator chip 104 may be a PM fiber 102. The alignment between the FA coupler 103 and the silicon photonics modulator chip 104 may be done by an active alignment approach, during which the intensity of an output laser light from PMF 102 over silicon photonic chip 104 to the output SMF 108 with the signal output LC receptacle 109a is maximized.

The active alignment approach used for the disclosed transmitter 100 of FIG. 1 may have the benefit of not requiring the fiber array coupler 103 to be assembled with as tight a tolerance as it would need to be for a passive alignment to the silicon photonics modulator chip 104 but requires the transmitter 100 to be operating during alignment, such that the output light through the main optical pathway of the transmitter 100 may be determined and maximized as described. Active alignment may require individual adjustments to be made to each interfacing component associated with the main optical pathway followed by a laser light through the transmitter. The signal output LC receptacle 109a may be disposed outside of the perimeter of the transmitter 100 itself and connected to the FA coupler 103 by the output SMF 108.

It should be understood that the term "main optical path" refers to the optical path utilized by the transmitter to produce and send an optical signal. Said main optical path may start at the laser source 101, proceed through the PMF 102, enter the silicon photonics chip through a laser input interface 104a, travel through a Mach-Zehnder interferometer data modulator 106, exit the silicon photonics modulator chip through a signal output interface 104b, travel through a signal output SMF 108 and finally conclude with traveling through a signal output LC receptacle 109a. This main optical path may remain unchanged between different embodiments of the disclosed transmitter 100.

The process of active alignment may begin with preliminary alignment of the FA coupler 103 with the silicon photonics modulator chip 104 by placing the said FA coupler 103 adjacent to said chip 104. Next, the DWDM laser source 101 may be used to provide a laser light to travel through the main optical pathway by going through the PMF 102, silicon photonics modulator chip 104 and output SMF 108. Following the introduction of the laser light from the laser source 101, the positioning of the FA coupler attached to the PMF 102 and output SMF 108 may be adjusted by modifying its position and angle until the intensity of the laser light exiting the output SMF 108, and thus the signal output LC receptacle 109a, is maximized. This positioning and angle adjustment may begin with coarse adjustments consisting of large changes to FA coupler 103 positioning and angle, followed by fine adjustments consisting of small changes to FA coupler 103 positioning and angle.

The process of maximizing the intensity of the laser light exiting the output SMF 108, and thus the signal output LC receptacle 109a, may involve finding a FA coupler 103 position and angle at which a first signal is detected exiting the output SMF 108, thus establishing a first maximum, followed by adjusting the FA coupler 103 again until a second signal is detected having an intensity greater than the first maximum, thus establishing a second maximum, and iterating on this process until a new maximum cannot be found. The intensity of laser light exiting the output SMF 108 is said to be maximized when adjustment to the positioning of the fiber array coupler 103 can no longer increase the intensity of said laser light exiting the output 108. Finally, once the light intensity leaving the output SMF 108 is maximized, the FA coupler 103 and silicon photonics modulator chip 104 may be secured to each other to maintain the established alignment. The attachment of the FA coupler 103 to the silicon photonics modulator chip 104 may utilize optical epoxy to ensure the optical connections between each applicable element are maintained.

In the disclosed transmitter 100, data transmission may be enabled through generation of a single wavelength PAM4 optical signal using a DWDM laser source 101 and a MZI data modulator 106 within the silicon photonics modulator chip. PAM4 encoding may be instructed by a PAM4 DSP, such as PAM4 DSP 514 of FIG. 5, that is responsible for instructing the generation of a single wavelength 100 Gbit/s PAM4 signal by encoding incoming data into the DWDM laser source within the MZI data modulator 106 by coordinating with the modulator driver chip 107. Said modulator driver chip 107 may be integrated into the PAM4 DSP 514 through a hybrid or monolithic approach. Said DWDM laser source may enter a first end 102a of an optically connected PM fiber 102, travel through the PM fiber 102 while maintaining its polarization, and exit the PM fiber 102 into silicon photonic modulator chip through the second end 102b of the PM fiber 102. This second end 102b of the PM fiber 102 may be sandwiched within the laser input channel 103a of fiber array coupler 103. As a result of the described active alignment, the second end 102b of the PMF 102 sandwiched within the laser input channel 103a may be optically connected to the laser input interface 104a of the silicon photonic modulator chip 104.

The silicon photonic modulator chip 104 may include a MZI data modulator 106 disposed between a laser input interface 104a and a signal output interface 104b, wherein a first photodetector 105a is disposed between the laser input interface 104a and the MZI data modulator 106 and a second photodetector 105b is disposed between MZI data modulator 106 and the signal output interface 104b. Each active component of the silicon photonics modulator chip 104 may be optically interconnected according to the disclosed arrangement. The modulator driver chip 107 may connect to and coordinate with the MZI data modulator 106 of the silicon photonics modulator chip 104 in order to properly facilitate the encoding and phase shifting of the split beams traveling through the MZI data modulator 106 of the silicon photonic modulator chip 104 into a singular wavelength PAM4 optical signal for DWDM applications.

Upon traveling through the silicon photonics modulator chip 104, a single wavelength 100 Gbit/s PAM4 signal may exit through the signal output interface 104b of said chip 104 and travel into an optically connected first end 108a of an output SM fiber 108 sandwiched within the signal output channel 103b of the FA coupler 103. The second end 102b of the polarization maintaining fiber 102 and the first end 108a of the output single mode fiber 108 may both be sandwiched within separate, corresponding V-shaped grooves and covered by a flat lid within the FA coupler 103 to ensure a secure fit and proper optical alignment with other optical components, such that the second end 102b of the polarization maintaining fiber 102 and the first end 108a of the output single mode fiber 108 are nested within the FA coupler 103. The fiber array coupler 103 may be configured to facilitate optical connections between the PM fiber 102 and the output SM fiber 108 and the appropriate interfaces of the silicon photonics modulator chip 104, as disclosed above, through the usage of said active alignment approach. Upon traveling through the output SM fiber 108, the generated PAM4 optical signal may travel through the signal output LC receptacle 109a optically connected to a second end 108b of the output SM fiber 108 for transmission of said signal to external sources. The disclosed transmitter 100 of FIG. 1 may operate as a portion of a transceiver assembly, such as transceiver 513 of FIG. 5.

Utilizing the disclosed silicon-based photonics modulator chip 104 may be desirable for a variety of reasons. Silicon-based photonics modulator chips 104 have a small footprint, low cost, high yield, and high performance, when compared to other material platforms such as LiNBO3, polymer, III-V, etc. Additionally, utilizing said silicon-based photonics modulator chip 104 in a single-wavelength 100 Gbit/s PAM4 DWDM transceivers, such as the pluggable transceiver module 513 outlined in FIG. 5, allows for the various benefits of utilizing single-wavelength PAM4 DWDM transceivers, such as the need for only a singular laser source, to be utilized alongside the advantages of a silicon photonics modulator chip 104. The disclosed aspects and features of the above disclosed transmitter 100 may provide a variety of benefits to a transceiver module that it is installed within, as will be described in greater detail hereinbelow.

Figure 2:
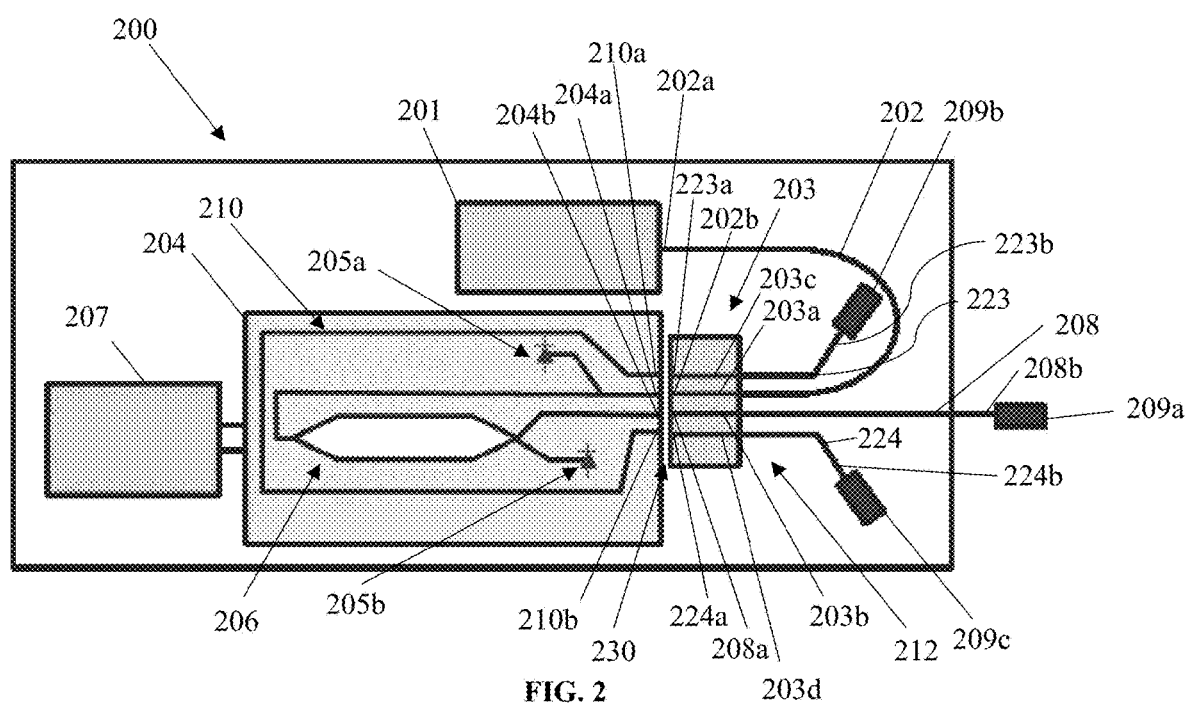
FIG. 2 illustrates the structure of the disclosed single-wavelength 100 Gbit/s PAM4 DWDM transmitter having a reference loop within a silicon photonics modulator chip and a four channel fiber array coupler, according to an aspect.

FIG. 2 illustrates the structure of the disclosed single-wavelength 100 Gbit/s PAM4 DWDM transmitter 200 having a reference loop 210 within a silicon photonics modulator chip 204 and a four channel fiber array coupler 203, according to an aspect. Much like the aforementioned transmitter 100 of FIG. 1, the herein disclosed transmitter 200 of FIG. 2 may be comprised of DWDM laser source 201, a fiber array FA pigtail 212, a modulator driver chip 207, and a silicon photonics modulator chip 204, wherein the silicon photonics modulator chip 204 includes a MZI data modulator 206 and two PDs 205a, 205b. Said transmitter may be further comprised of a reference loop 210 within the silicon photonics modulator chip 204. The reference loop 210 may connect to two separate loop SMFs 223, 224, each loop SMF having a corresponding attached loop LC receptacle 209b, 209c, through the usage of the two loop channels 203c, 203d configured to align each loop SMF with a corresponding loop input interface. In addition to the PMF 202, signal output SMF 208 and signal output LC receptacle 209a, the loop input SMF 223, loop output SMF 224, loop input LC receptacle 209b and loop output LC receptacle 209c may all be considered components of the disclosed FA pigtail 212 of transmitter 200. The four channel FA coupler 203 may be used to establish the same connections described between the silicon photonics modulator chip, the DWDM laser source and a signal output LC receptacle 209a described in transmitter 100, while including two additional channels configured to optically connect the silicon photonics modulator chip to two additional LC receptacles through the utilization of two additional corresponding loop SMFs.

The described reference loop may be utilized in the alignment of the FA coupler 203 and the silicon photonics modulator chip 204, wherein the alignment between the FA coupler 203 and the silicon photonics modulator chip 204 can be done by a passive alignment approach via maximizing the optical signal throughput through the LC receptacles 209b, 209c, loop SMFs 223, 224 and the reference loop 210, resulting in a laser light traveling through main optical pathway of the silicon photonics modulator chip 204 and out the signal output LC receptacle 209a being maximized as well, as a result of achieving optimized optical alignment. The FA coupler 203 of FIG. 2. may sandwich a portion of each fiber in place within a corresponding V-shaped groove and be covered by a flat top, such that the second end 202b of the PMF 202, first end 208a of the signal output SMF 208, first end 223a of the loop input SMF 223 and a first end 224a of the loop output SMF 224 are all sandwiched within a separate, corresponding V-shaped groove and covered by a flat lid within the FA coupler 203.

As with the described fibers of FIG. 1, each fiber may be described as having a portion that is nested within the FA coupler 203. In contrast to the hereinabove disclosed active alignment approach used in transmitter 100 of FIG. 1, the passive alignment approach used in transmitter 200 of FIG. 2 may use passive alignment structures, such as the reference loop 210, to enable the alignment of optical elements and may require the interfacing components to be manufactured with a tight tolerance but does not require the transmitter to be operating or otherwise utilizing its main optical pathway during alignment. The passive alignment pathway utilized in the passive alignment of disclosed FA coupler 203 and silicon photonics modulator chip 204 of FIG. 2 may begin with a reference light entering the loop input LC receptacle 209b, traveling through the loop input SMF 223 and into the loop input interface 210a of the silicon photonics modulator chip 204. Next, the reference light may travel through the reference loop 210 before exiting the loop output interface 210b of the silicon photonics modulator chip 204 and entering the loop output SMF 224. Finally, the reference light may travel through and exit the loop output SMF 224 through a loop output LC receptacle 209c.

The process of passive alignment may require positioning the fiber array coupler 203 such that it is positioned adjacently with the silicon photonics modulator chip 204, introducing a light beam to the silicon photonics modulator chip 204, such that a light beam travels through a loop input single mode fiber 223 partially sandwiched within the loop input channel 203c of the FA coupler 203, enters the silicon photonics modulator chip 204 through a loop input interface 210a, travels through a reference loop 210 within the silicon photonics modulator chip 204, exits the silicon photonics modulator chip through a loop output interface 210b and travels through a loop output single mode fiber 224 partially sandwiched within the loop output channel 203d, adjusting the position of the fiber array coupler 203 until the intensity of the laser exiting the loop output single mode fiber 224 is maximized and attaching a fiber array coupler 203 to the silicon photonics modulator chip 204 such that the fiber array coupler 203 is secured to the silicon photonics modulator chip 204. As described above, the FA coupler 203 may be attached to or otherwise secured to the silicon photonics modulator chip 204 through the utilization of optical epoxy.

The step of maximizing the output of light out of the loop output single mode fiber 224, and thus out of the attached loop output LC receptacle 209c may be an iterative process. If the after first positioning the fiber array couple adjacently to the silicon photonics modulator chip, no optical signal is received at the loop output LC receptacle 209c attached to the loop output single mode fiber 224, the fiber array couple 203 may be gradually adjusted until an optical signal is received at the loop output LC receptacle 209c. After receiving an optical signal through the loop output SMF 224, the fiber array couple 203 may be adjusted until a stronger optical signal (a laser beam having a greater intensity) is received at the loop output LC receptacle 209c. This stronger optical signal will be identified as a first maximum signal. The fiber array couple 203 may then be further adjusted until an optical signal stronger than the first maximum signal is discover, thus establishing a second maximum signal. This process of finding new maximum signals may be repeated until an optical signal stronger than the current maximum signal cannot be discovered, wherein said current maximum signal may be identified as the final maximum signal ("maximized signal") wherein optimized optical alignment between the FA coupler 203 and the silicon photonics modulator chip 204 is achieved.

The specific arrangement of elements within the disclosed transmitter 200 of FIG. 2 may be the same as those described for transmitter 100 of FIG. 1, with the exception of the reference loop 210 within the silicon photonics modulator chip 204 and the additional SMFs and connections associated with the reference loop 210, which may only be found in the former. As with the transmitter 100 of FIG. 1, the DWDM laser source 201 may emit a laser/light into the optically connected first end 202a of a PMF. Said light may then travel through the PMF 202 while maintaining its polarization and exit through a second end 202b of the PMF 202 into silicon photonics modulator chip. The second end 202b of the PMF 202 may be sandwiched within the laser input channel 203a of the FA coupler 203. The second end 202b of the PMF 202 may be optically connected to a laser input interface 204a on the silicon photonics modulator chip 204. The silicon photonic modulator chip 204 may include a MZI data modulator 206 disposed between a laser input interface 204a and a signal output interface 204b, wherein a first photodetector 205a is disposed between the laser input interface 204a and the MZI data modulator 206 and a second photodetector 205b is disposed between MZI data modulator 206 and the signal output interface 204b.

Each active component of the silicon photonics modulator chip 204 may be optically interconnected according to the hereinabove disclosed arrangement. The modulator driver chip 207 may be connected to and configured to coordinate with the silicon photonics modulator chip 204 in order to properly phase shift and encode the incoming split beams traveling through the MZI data modulator 206 into singular wavelength 100 Gbit/s PAM4 signal traveling prior to exiting the signal output interface 204b of silicon photonics modulator chip 204. The photonics modulator chip 204 of FIG. 2 may also include a reference loop 210 that travels through said photonics modulator chip, wherein said reference loop 210 is optically connected to and disposed between an input interface 210a and a loop output interface 210b disposed on a coupling surface (not shown) of the silicon photonics modulator chip 204.

Upon traveling through the silicon photonics modulator chip 204, the generated PAM4 optical signal may exit the signal output interface 204b of said chip 204 through the optically connected first end 208a of an output SM fiber 208. The first end 208a of the output SM fiber 208 may be sandwiched within the signal output channel 203b of the FA coupler 203 to facilitate proper optical alignment. Upon traveling through the output SMF 208, the generated single wavelength 100 Gbit/s PAM4 signal may travel through the signal output LC receptacle 209a disposed on a second end 208b of the output SM fiber 208 for transmission of said signal. The disclosed transmitter 200 of FIG. 2 may operate as a portion of a transceiver assembly, such as transceiver 513 of FIG. 5.

A loop input SMF 223 may have a first end 223a optically connected to the loop input interface 210a of the silicon photonics modulator chip 204 and sandwiched within the loop input channel 203c of the fiber array 203 and a second end 223b optically connected to a loop input LC receptacle 209b. A loop output SMF 224 may have a first end 224a optically connected to the loop output interface 210b of the silicon photonics modulator chip 204 and sandwiched within the loop output channel 203d of the fiber array 203 and a second end 224b optically connected to a loop output LC receptacle 209c. As with the transmitter of FIG. 1, a chip coupling end of the FA coupler 203 may be attached to a coupling surface on the silicon photonics modulator chip 204 to form an optical interface 230 using optical epoxy (not shown). The loop output channel 203d and the loop input channel 203c of the fiber array are configured to optically connect with the loop output interface 210b and the loop input interface 210a, respectively, in order to test proper optical alignment of each fiber with the appropriate silicon photonics modulator chip 204 interface.

The fiber array coupler 203 may be configured to facilitate optical connections between the PM fiber 202, loop input SMF 223, loop output SMF 224 and the signal output SMF 208 to the appropriate interfaces of the silicon photonics modulator chip 204, through the usage of a passive alignment approach as described above. By maximizing the optical throughput through the reference loop 210 and corresponding FA pigtail 212 elements, the operational/main optical pathway between DWDM laser source 201 to the signal output LC receptacle 209a may be properly aligned as well. In this way, the alignment of the fiber array coupler 203 with the silicon photonics modulator chip 204 may be performed without requiring the transmitter to be fully operational during alignment, thus simplifying assembly.

It should be understood that similar optical connection mechanisms may be utilized for any disclosed transmitter, as long as the optical connections between the fibers and the silicon photonic modulator chip 104, 204 is maintained. For example, in an alternative embodiment of the disclosed transmitter 200, each channel of the FA coupler 203, such as the laser input channel 203a, signal output channel 203b, loop input channel 203c and loop output channel 203d, may operate as a waveguide acting as an intermediate optical connection between each corresponding fiber and the silicon photonics modulator chip. In such cases, each fiber may be optically connected to its corresponding FA coupler 203 channel within the fiber array coupler 203 and each FA coupler channel may be optically connected to a corresponding interface on the silicon photonics modulator chip 204, such that each channel acts as an optical connection intermediary. For example, the second end 202a of the PMF 202 may be optically connected to the laser input channel 203a of the FA coupler 203 and the laser input channel 203a may be optically connected to the laser input interface 204a of the silicon photonics modulator chip 204. Such an alternative optical arrangement may be desirable in which a more direct optical connection between each fiber and the corresponding chip interface is not desirable.

FIG. 3A illustrates a fiber array pigtail 312 having a laser source within a TO package 311, according to an aspect. FIG. 3B illustrates the cross-sectional view of an output single mode fiber 308 and a polarization maintaining fiber 302 nested within a fiber array coupler 303, according to an aspect. FIG. 3C illustrates the cross-sectional view of a polarization fiber 302, according to an aspect. FIG. 3D illustrates a cross-sectional vi an angle offset interface between a silicon photonics modulator chip 304 and a FA coupler 303, according to an aspect. The laser source within the TO package 311 may be a DWDM laser source, such as DWDM laser source 101 of FIG. 1. The disclosed TO package 311 may be used to provide a hermetically enclosed and shielded DWDM laser source to the transmitter assembly 100 outlined in FIG. 1. The laser light within the TO package 311 may be optically coupled to the PM fiber 302 to enable the required optical interconnections described hereinabove in FIG. 1. As can be seen in FIG. 3A, a fiber protection sleeve 311a may be utilized in the connection between the first end 302a of the PMF 302 and the TO package 311 to ensure the PMF 302 is not strained or otherwise damaged during use. The slow axis 302d of PM fiber 302 may be configured to be in line with the e-field polarization direction of the laser light.

The polarization of a light beam in the PM fiber 302 may be maintained in the slow axis 302d during its propagation. The slow axis 302d of the PM fiber 302 at the chip coupling end 303e of the FA coupler 303 may be parallel or substantially parallel to FA coupler 303 top (or bottom) surface. The center points of the cores 302c of the PM fiber 302 may be disposed on the slow axis 302d of the PM fiber 302, as can be seen in FIG. 3C. In FIG. 3B, the cross-sectional shape of each channel within the FA couple 303 may be seen. Each channel, including the laser input channel 303a and the signal output channel 303b, may be comprised of a separate V-shaped groove 325 and a top lid 326 shared by each channel. As described previously, a portion of each fiber may be sandwiched between a corresponding V-shaped groove 325 and a top lid 326 in order to secure each fiber, such as the PMF 302, to the FA coupler 303.

As a result of undesirable light reflection between optically connected elements, the optical interface 330 between the silicon photonics modulator chip 304 and the FA coupler 303 may be oriented such that it is not normal to the nested PMF 302 and thus not normal to a laser light emitted from the laser source traveling between the FA coupler 303 and the silicon photonics modulator chip 304 through said optical interface 330. The coupling surface 304c of the silicon photonics modulator chip and the chip coupling end 303e of the FA coupler 303 may both be angled accordingly to facilitate the above-mentioned orientation of the optical interface 330. As can be seen in FIG. 3D, an initial laser light 327a within the PMF 302 sandwiched within the FA coupler 303 may be partially reflected as a reflected laser light 328 at the interface between the FA coupler 303 and the silicon photonics modulator chip 304, whereas the remainder of the initial laser light 327a may travel through the laser input interface 304a into the silicon photonics modulator chip as received laser light 327b.

By having an angle offset ("tilt angle") 329 of the interface 330 between the silicon photonics modulator chip 304 and the FA coupler 303, the reflected laser light 328 may not interfere with the laser light 327a or the laser source within a TO package 311. This angle offset 329 may result in the optical interface 330, and thus the chip coupling end 303e of the FA coupler 303, being tilted approximately 8 degrees from the normal of the PMF 302, as seen in FIG. 3D, such that laser light propagation between the two elements is optimized while minimizing the amount of laser light reflected into the main optical path. Said angle offset 329 may be the result of interfacing surfaces of the FA coupler 303 and the silicon photonics modulator chip 304 forming a supplementary angle pair with each other. While the described 8-degree tilt angle of the optical interface 330 may be a widely used industry standard to substantially minimize a reflection caused by the optical interface 330, alternative tilt angles, such as a 6-degree tilt angle, may also be utilized depending on the needs of the application. It should be understood that the optical interface 330 may be tilted in any suitable direction, such as the vertical direction, as depicted in FIG. 3D, or the horizontal direction defined by the FA axis 303g, as long as the reflected laser light 328 does not adversely impact transmitter performance or functionality.

As can be inferred by observation of the analogous elements in FIG. 1 and FIG. 3A, the TO package 311 integrated with the FA pigtail 312 disclosed in FIG. 3A is configured to be used within the transmitter assembly outlined in FIG. 1, wherein the disclosed FA pigtail 312 is configured to facilitate the connection between a singular signal output LC receptacle 309a, a TO package 311 having a laser source 101 and a silicon photonics modulation chip 104, as disclosed in FIG. 1. As can be seen in FIG. 3B, the center points of the cores of the PMF 302 and output SMF 308 may be disposed on the FA axis 303g of the FA pigtail 303, such that the center points of the cores PMF 302 and output SMF 308 are collinear with each other while nested within the FA coupler 303. The first end 302a of the PMF 302 may be optically attached to the TO package 311, whereas a second end 302b of the PMF 302 may be sandwiched within the FA coupler 303 to facilitate an optical connection with the silicon photonic modulator chip. The first end 308a of the output SMF 308 may be nested within the FA coupler 303 while a second end 308b of the output SMF 308 may be optically attached to a signal output LC receptacle 309a. The disclosed PMF 302 may be a PANDA PM fiber 302, as seen in FIG. 3C, wherein the fiber has two cylindrical cores 302c with circular cross sections, or another type of polarization maintaining fiber, such as a bowtie or elliptical-clad polarization maintaining fiber.

Figures 4A, 4B, 4C:
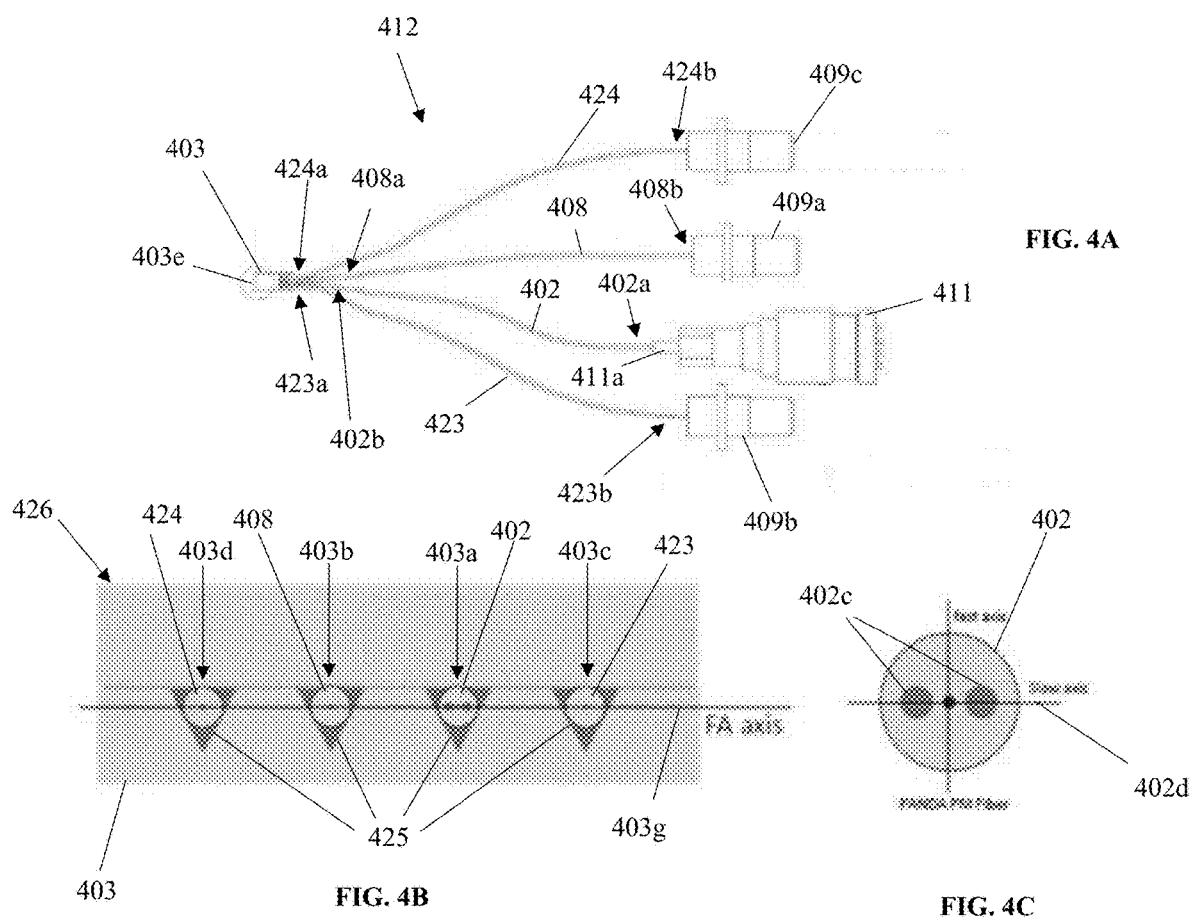
FIG. 4A illustrates a fiber array pigtail having a laser source enclosed within a TO package, according to an aspect.
FIG. 4B illustrates the cross-sectional view of single mode fibers and a polarization maintaining fiber nested within the fiber array coupler, according to an aspect.
FIG. 4C illustrates the cross-sectional view of a polarization maintaining fiber, according to an aspect.

FIG. 4A illustrates a fiber array pigtail 412 having a laser source within a TO package 411, according to an aspect. FIG. 4B illustrates the cross-sectional view of a single mode fibers and a polarization maintaining fiber 402 nested within a fiber array coupler 403, according to an aspect. FIG. 4C illustrates the cross-sectional view of a polarization maintaining fiber 402, according to an aspect. Similarly to the TO package 311 disclosed in FIG. 3A, the disclosed TO package 411 of FIG. 4 may utilize a PMF 402 to connect the TO package 411 to the FA coupler 403. Unlike the FA coupler 303 disclosed in FIG. 3A, the FA coupler 403 disclosed in FIG. 4A includes two additional channels, such as loop input channel 203c and loop output channel 203d in FIG. 2. Said loop input channel 203c and loop output channel 203d are configured to facilitate the optical connections of the loop input interface 210a and the loop output interface 210b to the first end 423a of the loop input SMF 423 and the first end 424a of the loop output SMF 424, respectively. Each loop fiber is also connected to a corresponding LC receptacle, such that the second end 423b of the loop input SMF 423 is optically connected to a loop input LC receptacle 409b and the second end 424b of the loop output SMF 424 is optically connected to a loop output LC receptacle 409c. As can be inferred by observation of the analogous elements in FIG. 2 and FIG. 4A, the TO package 411 integrated with FA pigtail 412 disclosed in FIG. 4A is configured to be used within the transmitter 200 outlined in FIG. 2, wherein the disclosed FA pigtail 412 is configured to facilitate the proper connections between the three corresponding LC receptacles, a TO package 411 having a laser source 201 and a silicon photonics modulation chip 204, wherein said chip 204 has a reference loop 210 with a loop input interface 210a and a loop output interface 210b, as disclosed in FIG. 2.

Additional similarities may also be drawn between the different TO packages 311, 411 and their corresponding integrated FA pigtails 312, 412 disclosed in FIGS. 3A-3C and FIGS. 4A-4C, respectively. As can be seen in FIG. 4A a fiber protection sleeve 411a may be utilized in the optical connection between the first end 402a of the PMF 402 and the TO package 411 to ensure the PMF 402 is not strained or otherwise damaged during use. Also, the slow axis 402d of PM fiber 402 of the FA coupler 403 is configured to be in line with the e-field polarization direction of the laser light. The polarization of a light beam in the PM fiber 402 may be maintained in the slow axis 402d during its propagation. The slow axis 402d of the PM fiber 402 at the chip coupling end 403e of the FA coupler 403 may be parallel or substantially parallel to FA coupler 403 top (or bottom) surface. The center points of the cores 402c of the PM fiber 402 may be disposed on the slow axis 402d of the PM fiber 402, as can be seen in FIG. 4C.

As can be seen in FIG. 4B, the center points of the cores 402c of the PMF 402 and each SMF may be disposed on the FA axis 403g of the FA coupler 403, such that the center points of the cores of the PMF 402 and each SMF are collinear with each other while within the FA coupler 403. Additionally, similarly to the FA couple 303 of FIG. 3B, each channel within the FA coupler 403, including the laser input channel 403a, signal output channel 403b, loop input channel 403c and loop output channel 403d may be comprised of a separate V-shaped groove 425 and a top lid 426 shared by each channel, wherein each fiber of the FA pigtail 412 is sandwiched within a corresponding V-shaped groove by the top lid 426, such that the corresponding end of each fiber is nested within the FA coupler 403.

As described previously in FIG. 2, a first end 402a of the PMF 402 may be optically connected to a laser source, such as the TO package 411, whereas a second end of the PMF 402b may be sandwiched within a FA coupler 403 for optical connection to the laser input interface 204a. The first end 408a of the output SMF 408 may be sandwiched within the FA coupler 403 for optical connection to a signal output interface 204b, whereas a second end 408b of the output SMF 408 may be optically connected to a signal output LC receptacle 409a. The first end 423a of the loop input SMF 423 may be nested within the FA coupler 403 to facilitate optical connection with the loop input interface 210a and while a second end 423b of said loop input SMF 423 may be optically connected to a loop input LC receptacle 409b. The first end 424a of the loop output SMF 424 may be sandwiched within the FA coupler 403 for optical connection with the loop output interface 210b and while a second end 424b of said loop output SMF 424 may be optically connected to a loop output LC receptacle 409c.

Similarly to the interface between the FA coupler 303 and the silicon photonics modulator chip 304 described in FIG. 3D, the interface between the disclosed FA coupler 403 of FIG. 4 and an adjoined silicon photonics modulator chip may be at an angle that is not normal to the laser light beam traveling through them. This interface angle may be the result of the supplementary angle pair formed between the adjoined FA coupler 403 and silicon photonics modulator chip. As described hereinabove in FIG. 3D, by having an angle offset between these two aforementioned elements, the reflected light may be diverted such that it does not interfere with the main optical path. In an embodiment, the interface between the silicon photonics modulator chip and the FA coupler may be offset (e.g., tilted) by about 8 degrees, as seen in FIG. 3D, such that said offset results in a supplementary angle pair forming between said two elements at their optical interface.

Figure 5:
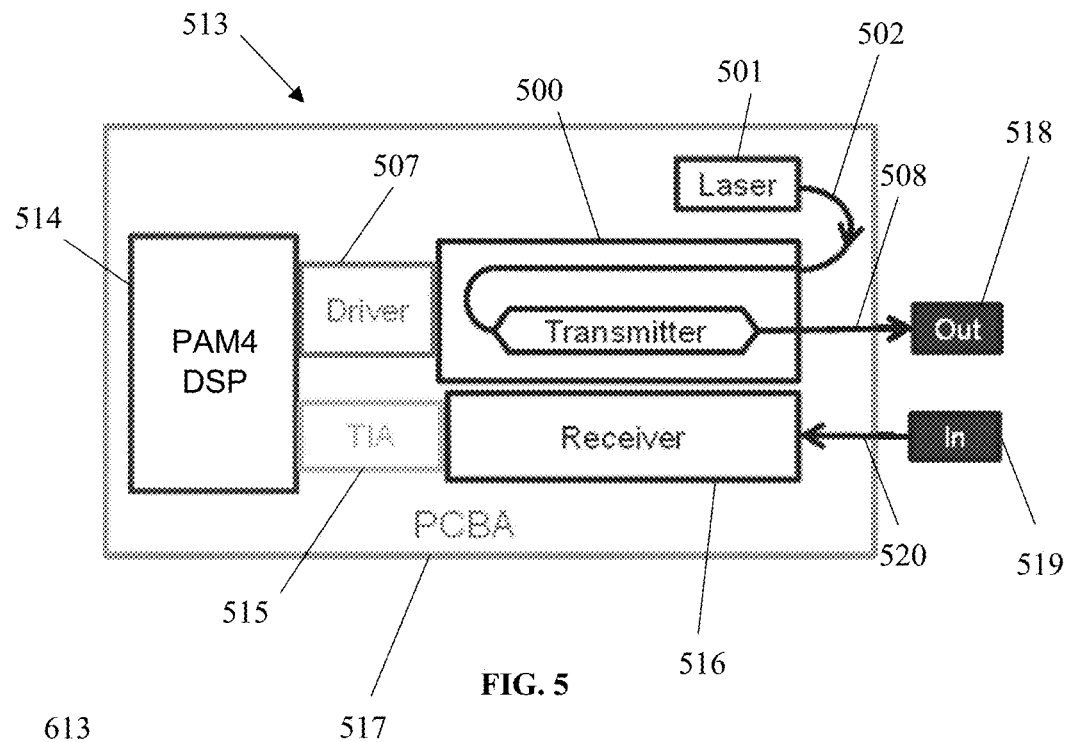
FIG. 5 illustrates a schematic of the function blocks in a pluggable transceiver module, according to an aspect.

FIG. 5 illustrates a schematic of the function blocks in a pluggable transceiver module 513, according to an aspect. The disclosed pluggable transceiver module 513 may be comprised of the disclosed optical transmitter 500, together with a receiver 516, modulator driver 507, linear transimpedance amplifier (TIA) 515, a PAM4 digital signal processor 514 ("PAM4 DSP", "DSP"), and other supporting electronic circuits (not shown). The receiver 516 may be comprised of a high-speed photodetector which is electrically connected to TIA 515 via wire bonding or flip-chip techniques. The PAM4 DSP 514 may be used to provide PAM4 signal generation and detection to the disclosed pluggable transceiver module 513. All of these components may be packaged onto a printed circuit board assembly ("PCBA") 517 through chip-on-board packaging technology. For a compact package, said modulator driver and TIA may be integrated into PAM4 DSP through hybrid or monolithic approach. The laser source 501 and modulator driver chip 507 may be provided as elements that are separate and distinct from the disclosed transmitter 500, as can be seen in FIG. 5 or the laser source 101 and modulator driver chip 107 may be included as part of the transmitter 100, as seen in FIG. 1.

The disclosed pluggable transceiver module 513 may be interconnected as depicted in FIG. 5, wherein the disclosed elements are arranged on a singular printed circuit board assembly 517. A laser 501 may be connected to the transmitter 500 utilizing the optical connection described hereinabove, such as a PMF 102 optically connected to the transmitter, or other know optical connection methods known in the industry. The transmitter 500 may be further attached to a modulator driver chip 507, such as the disclosed modulator driver chip 107, through the use of wire bonding or flip-chip techniques and a data output couple 518, such as signal output LC receptacle 109a of FIG. 1, may be optically connected to the transmitter 500 using an output SMF 108 optically connected to the transmitter 500. The described optical connections utilized herein may be the same as those outlined in the descriptions of FIGS. 1-4. All other connections described may utilize wire bonding, flip chip techniques, or other known electric connection methods, unless otherwise noted.

The described PAM4 DSP 514 may be connected to both the modulator driver chip 507 and the described TIA 515 to provide signal generation and signal detection capabilities to the transceiver. The TIA 515 may be electrically connected to a receiver 516. Said receiver may be optically connected to a signal input couple 519, which may be a LC receptacle, through the usage of a signal input cable 520, which may be a SMF similar to those described hereinabove. All elements that directly transmit/receive an optical signal may utilize suitable optical connections to ensure proper optical communication between said elements. It should be understood that comparable interconnection methods may be utilized to facilitate the interconnection of the disclosed transceiver elements.

The disclosed transceiver may both receive and transmit signals, meaning that there is no predefined order in which said transceiver must operate. For the purposes of illustrating device functionality, the below embodiment will outline the process followed by the transceiver in response to receiving a single wavelength PAM4 optical signal via its signal input couple. Upon a single wavelength PAM4 optical signal reaching the signal input couple 519, the optical signal may travel through a signal input cable 520, until entering the receiver 516. Said receiver 516 may be a photodetector, or other device capable of converting the received optical signal into an electronic signal. The receiver 516 may then send the electronic signal to the TIA 515. Said TIA 515 may suitably amplify the electronic signal received from the receiver 516 in order to ensure suitable signal conditions for the coming signal detection operations.

After the amplification of said signal as needed, the received electronic signal may proceed to the PAM4 DSP 514 for detection. As described above, the DSP 514 may be configured provide a means of detecting and generating an electrical PAM4 signal. It is here that the PAM4 electrical signal may be detected and potentially converted into a different format, such as four separate NRZ (non-return to zero) electrical signals to facilitate electrical connections that are less demanding on the electrical operating bandwidth.

For the transmission of a signal from the disclosed transceiver 513, the PAM4 DSP 514 may coordinate with the modulator driver chip 507 in order to instruct the MZI data modulator of the transmitter on how to encode each split beam traveling through the MZI data modulator from the DWDM laser source, such that upon combining each split beam into a singular wavelength optical signal, the resulting optical signal will have all the encoded data in a singular PAM4 optical signal. The MZI data modulator may split the incoming laser light to allow each split beam to be encoded with a set of data, for combination into a singular wavelength signal. This results in the transmitter requiring fewer optical components, as the incoming laser source enters the silicon photonics modulator chip through a single PMF and exits said chip through a singular output SMF, with the splitting and joining of each laser beams being performed solely within the MZI data modulator.

It should be understood that alternative configurations of the disclosed transceiver 513 may be implemented. For example, as disclosed above, the disclosed modulator driver chip 507 may be incorporated into the structure of the PAM4 DSP 514. Such an embodiment of the disclosed transceiver may be referred to as "driverless" due to the absence of an independent driver structure within said transceiver 513. Similarly, the structure of the linear transimpedance amplifier 515 may also be incorporated in the PAM4 DPS 514. As such, the modulator driver chip 507 and the linear transimpedance amplifier 515 may be monolithically integrated into the structure of the PAM4 DSP 514, such that the herein disclosed transceiver embodiment utilizes a "driverless" architecture.

Figure 6:
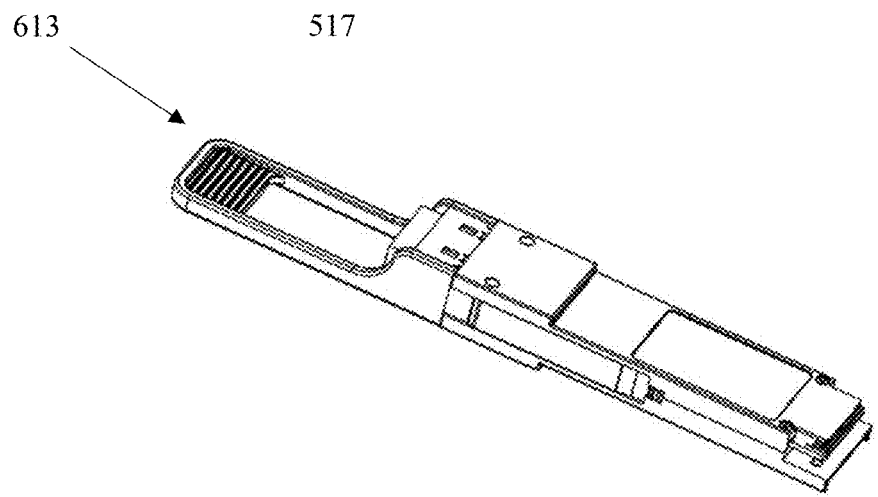
FIG. 6 illustrates a single wavelength 100 Gbit/s PAM4 DWDM QSFP28 transceiver module, according to an aspect.

FIG. 6 illustrates a single wavelength 100 Gbit/s PAM4 DWDM QSFP28 transceiver module 613, according to an aspect. To enhance the disclosed transceiver module DWDM transmission performance, forward error correction (FEC) functions may be integrated into said transceiver 613 such that the transceiver 613 can be directly used in standard 100 G switches without required FEC capability, thus further simplifying the DWDM transmission systems and reducing the DWDM system costs. The disclosed single wavelength PAM4 transceiver 613 that utilizes the hereinabove described silicon photonics-based transmitter for C-band DWDM applications provides a variety of benefits to said transceiver 613. As described previously, silicon-based transmitters may enjoy a wide array of benefits, including having a low cost, high yield, small footprint, high performance when compared to other material platforms such as LiNBO3, polymer, III-V, etc., and complementary metal-oxide-semiconductor (CMOS) compatibility.

Single wavelength PAM4 transceivers also provide advantages over other known types of transceiver, needing only one optical path to transport a single wavelength signal between the transmitters and receivers of communicating transceivers, and generally requiring fewer optical components than other know 100 G technologies which may utilize 4 lane 25 Gbit/s NRZ signals to achieve comparable data transfer speeds. Additionally, the disclosed transceiver 613 only uses one DWDM laser source, such as laser source 501 of FIG. 5, wherein said laser light 501 is split within the disclosed MZI data modulator of the silicon photonics modulator chip for encoding multi-level electrical signals provided by the connected modulator driver chip 507 and PAM4 DSP 514 into a singular wavelength optical signal for transmission. The usage of the disclosed silicon based PAM4 transceiver 513 in C-band DWDM applications allows the numerous advantages provided by said transceiver to benefit these applications, wherein said application have great significance to modern and emerging technologies.

Figure 7A:
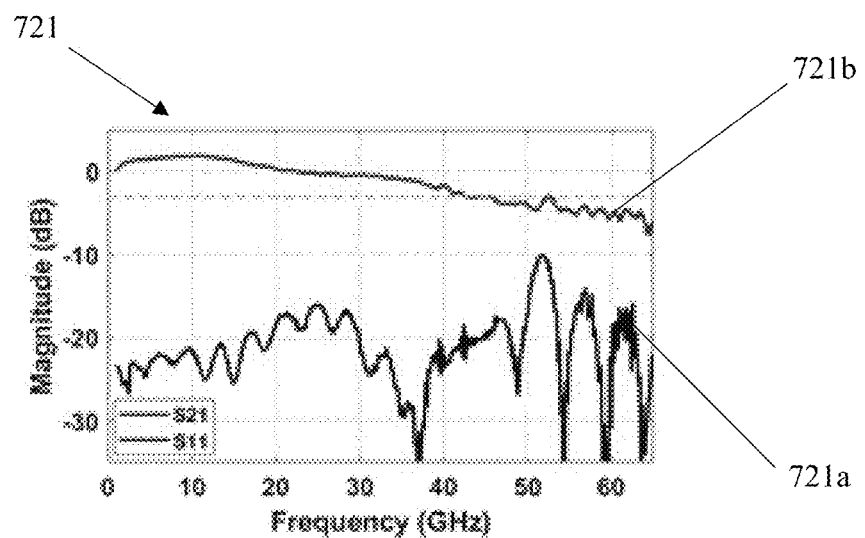
FIG. 7A illustrates a graph showing high speed characterization results of a modulator, wherein the magnitude of S11 and S21 S-parameters over a range of frequencies are displayed, according to an aspect.
Figure 7B:
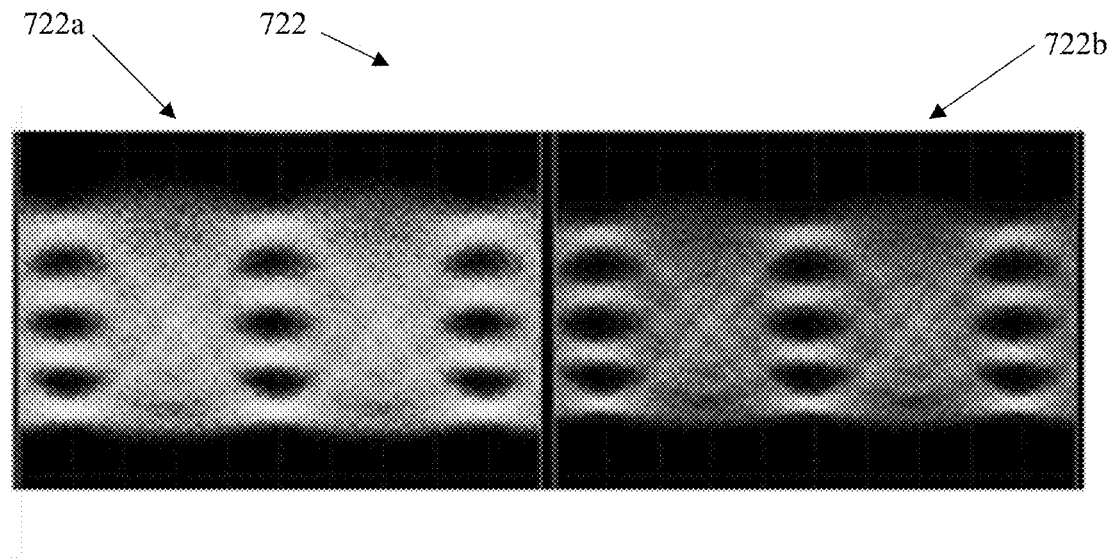
FIG. 7B illustrates the optical PAM4 eye diagrams for the disclosed transceiver measured by a digital communication analyzer, according to an aspect.

FIG. 7A illustrates a graph 721 showing high speed characterization results of a MZI data modulator disclosed hereinabove, wherein the magnitude of S11 721a and S21 721b of S-parameters over a range of frequencies are displayed, according to an aspect. FIG. 7B illustrates the optical PAM4 eye diagram 722 for the disclosed transceiver measured by a digital communication analyzer, according to an aspect. To demonstrate this silicon-photonics-based single-wavelength 100 Gbit/s PAM4 DWDM transmitter in pluggable form factor, high-speed characterization results of the MZI data modulator are provided in FIG. 7A.

S-parameter tests were conducted using a 65 GHz vector network analyzer and a calibrated high-speed receiver module. The plots of the S21 721b and S11 721a of S-parameters of the modulator disclosed hereinabove are shown in FIG. 7A, with 3-dB EO bandwidth of 41 GHz at −0.5V bias and reflection coefficient well below −10 dB. With these above performance parameters being comparable to those of known transceivers in the industry and the additional advantages of the disclosed transceiver's compact form factor, low power requirement and long transmission distance when compared to said known transceivers, the herein disclosed transceiver may provide a desirable alternative to the known transceivers currently used in the industry.

In addition, an eye diagram measurement, as seen in FIG. 7B, is performed using an MZI data modulator 106 wire-bonded with a modulator driver chip 107. A DSP, such as PAM4 DSP 514 of FIG. 5, is used to provide a 53.125 GBaud SSPRQ PAM4 signal. With the MZI data modulator 106 biased at its quadrature point, the optical PAM4 eye diagram is measured by a digital communication analyzer, as shown in FIG. 7B, wherein diagram 722a shows the PAM4 eye diagram prior to equalization, and the diagram 722b shows the PAM4 eye diagram after equalization. The PAM4 eye diagrams 722a, 722b exhibit an outer extinction ratio (ER) of 5.2 dB, a transmitter and dispersion eye closure for PAM4 (TDECQ) of 1.5 dB, an averaged power around +1 dBm, and a ratio level mismatch (RLM) of 0.98. The Ratio level mismatch of 0.98 measured for the disclosed silicon-photonics based single-wavelength 100 Gbit/s PAM4 DWDM transmitter indicates only a low degree of compression between the different levels of a PAM4 signal, wherein attaining a low degree of compression is desirable for establishing optimal device performance.

The disclosed silicon-photonics-based single-wavelength 100 Gbit/s PAM4 DWDM transceiver can be deployed as a cost-effective, energy-efficient, and low-latency solution in IM/DD optical links for applications including but not limited to the next-generation intra- and inter-datacenter optical interconnects. The utilization of the disclosed transceiver at C-band will allow said transceiver to provide its hereinabove described benefits to all applicable C-band DWDM applications. It should be understood that the PAM4 DWDM transceiver disclosed herein may be adapted for use with multiple wavelength ranges, including, but not limited to, O, E, S, and L-band. It should also be understood that PAM4 DWDM transceiver disclosed herein may be adapted for use with high data rate and other type of PAM signals, including, but not limited to, a single wavelength 200 Gbit/s, PAM5, PAM6, PAM8.

Figure 8:
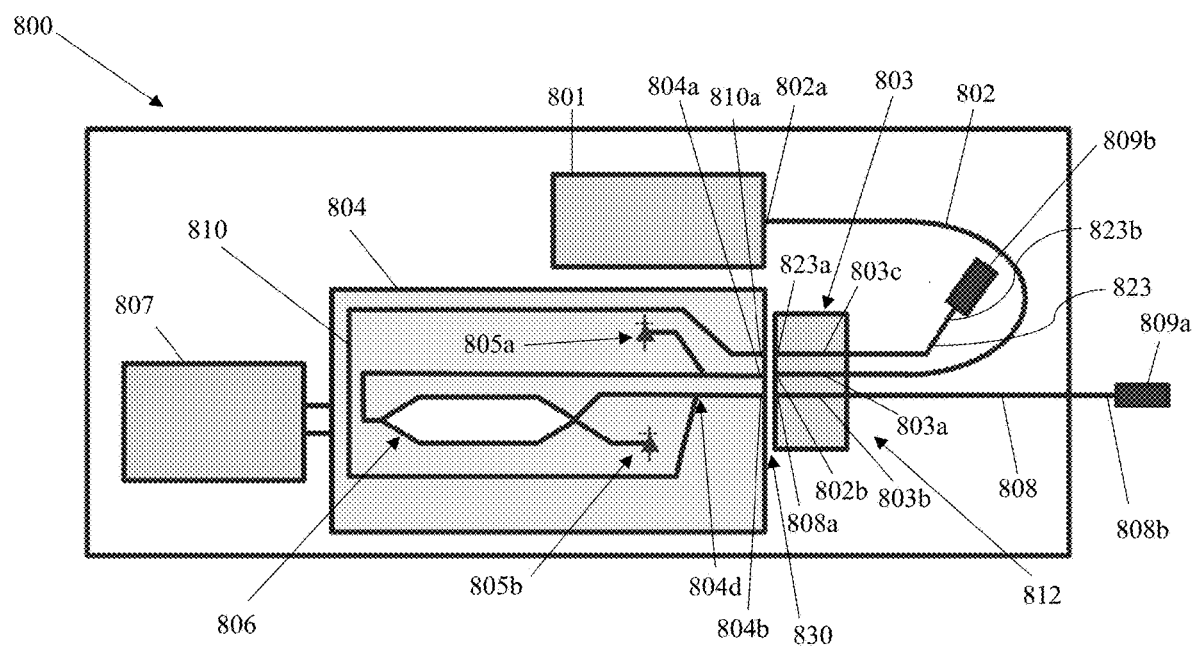
FIG. 8 illustrates the structure of an alternative embodiment of the disclosed single-wavelength 100 Gbit/s PAM4 DWDM transmitter having a silicon photonics modulator chip, said silicon photonics modulator chip having a reference loop that couples with the main optical path, according to an aspect.

FIG. 8 illustrates the structure of an alternative embodiment of the disclosed single-wavelength 100 Gbit/s PAM4 DWDM transmitter 800 having a silicon photonics modulator chip 804, said silicon photonics modulator chip 804 having a reference loop 810 that couples with the main optical path, according to an aspect. Transmitter 800 of FIG. 8 may share many similarities with the prior disclosed transmitters of FIG. 1 and FIG. 2. The disclosed transmitter 800 of FIG. 8 may be comprised of a laser source 801, a fiber array FA pigtail 812, a modulator driver chip 807, and a silicon photonics modulator chip 804, wherein the silicon photonics modulator chip 804 includes a MZI data modulator 806 and two PDs 805a, 805b disposed within said chip 804, as described for transmitter 200 described in FIG. 2. The silicon photonics modulator chip 804 may be further comprised of reference loop 810 and a tap coupler ("tap") 804d, which will be described in greater detail hereinbelow.

The FA pigtail 812 of transmitter 800 may be comprised of an FA coupler 803, a PMF 802, an output SMF 808, loop input SMF 823, a signal output LC receptacle 809a, and a loop input LC receptacle 809b. The FA coupler 803 may have a laser input channel 803a configured to sandwich a second end 802b of the PM fiber 802, a signal output channel 803b configured to sandwich a first end 808a of the output SMF 808 and a loop input channel 803c configured to sandwich a first end 823a of the loop input SMF. The first end 802a of the PM fiber 802 may be optically connected to the laser source 801, while its second end 802b is configured to optically connect to the laser input interface 804a of the silicon photonics modulator chip 804. The second end 808b of the signal output SMF 808 may be optically connected to a signal output LC receptacle 809a, while its first end 808a is configured to optically connect to the signal output interface 804b of the silicon photonics modulator chip 804. The second end 823b of the loop input SMF 823 may be to optically connect to a loop input LC receptacle 809b, while the first end 823a of the loop input SMF 823 is configured to optically connect to the loop input interface 810a of the silicon photonics modulator chip 804. The optical connections between each fiber and its corresponding interface on the silicon photonics modulator chip 804 may occur at the optical interface 830 between the FA coupler 803 and said silicon photonics modulator chip 804.

Similarly to the silicon photonics modulator chip of FIG. 2, the disclosed alternative embodiment of silicon photonics modulator chip 804 may have a loop input interface 810a, laser input interface 804a and a signal output interface 804b disposed on a coupling surface (not shown) of the silicon photonics modulator chip 804. Unlike the silicon photonics modulator chip of FIG. 2, a tap coupler 804d may be disposed within the chip 804 between the MZI data modulator 806 and the signal output interface 804b. A reference loop ("loopback path") 810 may be disposed between the loop input interface 810a and the tap coupler 804d, such that an alignment reference light may be introduced through the loop input interface 810a, travel through the reference loop 810 and be coupled into the main optical path by the tap coupler 804d before exiting the silicon photonics modulator chip 804 through the signal output interface 804b, wherein the loop input interface 810a, reference loop 810, tap coupler 804d and signal output interface 804b are all optically connected.

As with the previous described transmitter of FIG. 2, the MZI data modulator 806 of transmitter 800 may be disposed between the laser input interface 804a and the signal output interface 804b. The second photodetector 805b may be disposed between the MZI data modulator 806 and the tap 804d, while the first photodetector 805a may be disposed between the MZI data modulator 806 and the laser input interface 804a. As such, the main optical path through this alternative silicon photonics chip 804 may begin with entry through the laser input interface 804a, passing by the first photodetector 805a, traveling through the MZI data modulator 806 and the tap coupler 804d and out of the signal output interface 804b.

The tap coupler 804d may be configured to only couple 3% or less of the incoming alignment reference light such that the optical insertion loss from the reference loop to the signal output interface 804b may be about 15.2 dB or greater. Said optical insertion loss for the alignment reference light does not notably impact device performance or alignment, as the output intensity of the alignment reference light merely needs to be maximized, as described for previous alignment processes, to ensure proper alignment of a FA coupler with the silicon photonics modulator chip 804. Once the output intensity of the alignment reference light out of the signal output interface 804b is maximized, the disclosed silicon photonics modulator chip 804 may be secured to a corresponding FA coupler to complete the passive alignment process.

The rationale for using a tap coupler 804d configured to only couple 3% or less of the alignment reference light out of the signal output interface 804b during alignment is that such the tap coupler 804d will not significantly impact the signal output from the main optical path during device operation. For example, a tap coupler configured to couple 3% of the alignment reference light out of the signal output interface 804b may only result in an optical insertion loss of 0.13 dB on the main optical path. Such an insertion loss is small and tolerable, and perhaps even negligible, for practical applications. The tap coupler 804d may be configured to couple less than 3% of the alignment reference light out of the signal output interface 804b to further minimize optical losses for a signal traveling on the main optical path, as long as the resultant output of the alignment reference light is sufficient to allow for its intensity maximization during alignment.

The disclosed alternative embodiment of the silicon photonics modulator chip 804 in FIG. 8 may provide all of the benefits disclosed for a silicon photonics modulator chip 804 that utilizes passive alignment, such as not requiring the said chip 804 to be powered up during alignment, as well as additional benefits as a result of its unique conformational arrangement. When compared to the silicon photonics modulator chip 204 of FIG. 2, the presently disclosed silicon photonics modulator chip 804 of FIG. 8 does not require a loop output interface disposed on its coupling surface. This in turn removes the need of the extra channel in the FA coupler and the need for a loop output SMF and loop output LC receptacle, thus reducing transmitter cost. Additionally, the utilization of the signal output interface 804b in the passive alignment process guarantees that said signal output interface 804b is properly aligned with the FA coupler, without relying heavily upon parts tolerances.

In the passive alignment process of FIG. 2, the alignment of the signal output interface 204b is reliant upon both maximizing the light throughput between the reference loop 210 and the FA pigtail 212 and the signal output SMF 208 being properly positioned within the signal output channel 203b of the FA coupler 203. This is not the case in the silicon photonics modulator chip 804 of FIG. 8, wherein simply maximizing the intensity of the output alignment reference light as described guarantees proper alignment of the signal output interface 804b with the FA coupler. The relaxation of assembly requirements for the FA coupler, and thus FA pigtail, may also reduce the cost of manufacturing the corresponding parts.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/ or examples. Hence, the scope of the invention is defined by the accompanying claims and their equivalents. Further, each and every claim is incorporated as further disclosure into the specification.

What is claimed is:

1. A transceiver comprising a transmitter, the transmitter having:
    a DWDM laser source;
    a fiber array pigtail having:
        a fiber array coupler;
        a polarization maintaining fiber having a first end configured to optically connect with the DWDM laser source and a second end nested within a laser input channel within the fiber array coupler;
        an output single mode fiber having a first end nested within a signal output channel within the fiber array coupler and a second end optically connected to a signal output LC receptacle;
        a loop input single mode fiber having a first end nested within a loop input channel within the fiber array coupler and a second end optically connected to a loop input LC receptacle;
        a loop output single mode fiber having a first end nested within a loop output channel within the fiber array coupler and a second end optically connected to a loop output LC receptacle;
    a silicon photonics modulator chip connected to the fiber array coupler, the silicon photonics modulator chip comprising:
        a laser input interface optically connected to the second end of polarization maintaining fiber;
        a signal output interface optically connected to the first end of the signal output single mode fiber;
        a loop input interface optically connected to the first end of the loop input single mode fiber;
        a loop output interface optically connected to the first end of the loop output single mode fiber;
        a reference loop disposed between the loop input interface and the loop output interface;
        a Mach-Zehnder interferometer disposed between the laser input interface and the signal output interface;
        a first photodetector disposed between the laser input interface and the Mach-Zehnder interferometer;
        a second photodetector disposed between the signal output interface and the Mach-Zehnder interferometer; and
    a modulator driver chip electrically connected to the silicon photonics modulator chip;
    wherein the transceiver is configured to transmit and receive a single wavelength 100 Gbit/s PAM4 optical signals.

2. The transceiver of claim 1, further comprising a PAM4 DSP configured to electrically connect to the modulator driver chip; a linear transimpedance amplifier configured to electrically connect to the PAM4 DSP, a receiver configured to electrically connect with the linear transimpedance amplifier, and a signal input coupler configured to optically connect with the receiver through the usage of a signal input cable.

3. The transceiver of claim 2, wherein the modulator driver chip and linear transimpedance amplifier are monolithically integrated into the PAM4 DSP.

4. The transceiver of claim 2, wherein the silicon photonics modulator chip, modulator driver chip, PAM4 DSP, linear transimpedance amplifier and receiver are configured to connect with each other as a result of their integration into a printed circuit board assembly.

5. The transceiver of claim 2, wherein the PAM4 DSP is configured to enable the transceiver to both generate and detect PAM4 signals.

6. The transceiver of claim 1, wherein the polarization maintaining fiber is a PANDA polarization maintaining fiber.

7. The transceiver of claim 1, wherein the DWDM laser source is hermetically packaged within a shielded enclosure.

8. The transceiver of claim 1, further comprising a fiber protection sleeve disposed between a transistor outline package and the first end of the polarization maintaining fiber.

9. The transceiver of claim 1, wherein the reference loop is configured to facilitate a passive alignment approach for the attachment of the fiber array coupler to the silicon photonics modulator chip.

10. A transceiver comprising a transmitter, the transmitter having:
    a laser source;
    a fiber array pigtail having:
        a fiber array coupler;
        a polarization maintaining fiber having a first end configured to optically connect with the laser source and a second end nested within a laser input channel within the fiber array coupler;
        an output single mode fiber having a first end nested within a signal output channel within the fiber array coupler and a second end optically connected to a signal output LC receptacle;
    a silicon photonics modulator chip connected to the fiber array coupler, the silicon photonics modulator chip comprising:
        a laser input interface optically connected to the second end of polarization maintaining fiber;
        a signal output interface optically connected to the first end of the signal output single mode fiber; and
    a modulator driver chip connected to the silicon photonics modulator chip.

11. The transceiver of claim 10, wherein the fiber array coupler is attached to the silicon photonics modulator chip using an active alignment approach.

12. The transceiver of claim 10, further comprising a reference loop within the silicon photonic modulator chip.

13. The transceiver of claim 10, wherein said transceiver is provided in a pluggable form factor.

14. The transceiver of claim 10, wherein the transmitter is configured to transmit an optical signal having a singular wavelength.

15. The transceiver of claim 14, wherein the singular wavelength is transmitted at C-band or O-band.

16. The transceiver of claim 15, wherein the transmitter is configured to transmit data at a rate of 100 Gbit/s.

17. The transceiver of claim 10, wherein an optical interface disposed between a coupling surface on the silicon photonics modulator chip and a chip coupling end of the fiber array coupler is not normal to a laser light emitted from the laser source traveling through said optical interface.

18. The silicon photonics modulator chip of claim 10, further comprising a Mach-Zehnder interferometer disposed between the laser input interface and the signal output interface, a tap coupler disposed between the Mach-Zehnder interferometer and the signal output interface, a loop input interface disposed on a coupling surface of the silicon photonics modulator chip and a reference loop disposed between the loop input interface and the tap coupler, wherein the loop input interface, reference loop, tap coupler and signal output interface are optically connected.

19. A method of passively aligning a fiber array coupler with a silicon photonics modulator chip comprising the steps of:
- positioning the fiber array coupler such that it is positioned adjacently with the silicon photonics modulator chip;
- introducing a laser source to the silicon photonics modulator chip, such that a laser travels through a loop input single mode fiber nested within a loop input channel within the fiber array coupler, enters the silicon photonics modulator chip through a loop input interface on the silicon photonics modulator chip, travels through a reference loop within the silicon photonics modulator chip, exits the silicon photonics modulator chip through a loop output interface and travels through a loop output single mode fiber nested within a loop output channel within the fiber array coupler;
- adjusting the position of the fiber array coupler until the intensity of the laser exiting the loop output single mode fiber is maximized; and
- attaching a fiber array coupler to the silicon photonics modulator chip such that the fiber array coupler is secured to the silicon photonics modulator chip.

20. The passive alignment method of claim 19, wherein said passive alignment of the fiber array coupler with the silicon photonics modulator chip results in the optical connection of a signal output interface within the silicon photonics modulator chip with an output single mode fiber nested within the fiber array coupler and the optical connection of a laser input interface within the silicon photonic modulator chip with a polarization maintaining fiber nested within the fiber array coupler.

* * * * *